United States Patent [19]

Ootsuka et al.

[11] Patent Number: 5,173,784
[45] Date of Patent: Dec. 22, 1992

[54] VIDEO DISC PLAYER

[75] Inventors: Tooru Ootsuka, Chiba; Noriyuki Yamashita, Tokyo, both of Japan

[73] Assignee: Sony Corporation, Tokyo, Japan

[21] Appl. No.: 512,971

[22] Filed: Apr. 23, 1990

[30] Foreign Application Priority Data

Apr. 25, 1989 [JP] Japan .................. 1-105077

[51] Int. Cl.⁵ ............................................. H04N 5/95
[52] U.S. Cl. ................................. 358/337; 358/907; 358/338; 358/342
[58] Field of Search ............... 358/337, 338, 907, 324, 358/321, 342, 335, 310, 320; 369/32

[56] References Cited

U.S. PATENT DOCUMENTS 4,970,602 11/1990 Yoshio .................. 358/341
5,089,900 2/1992 Yokogawa .................. 358/338
5,111,305 5/1992 Yamashita .................. 358/342

Primary Examiner—Tommy P. Chin
Assistant Examiner—Robert Chevalier
Attorney, Agent, or Firm—Philip M. Shaw, Jr.

[57] ABSTRACT

A video disc player comprises a gray level picture display device for displaying a gray level picture during a track jump and a phase difference detecting circuit for detecting a phase difference between a phase of a horizontal synchronizing signal involved in a reproduced video signal and a horizontal phase for a gray level display during a so-called scan reproduction mode. The horizontal synchronizing signal of the gray picture is corrected so that the above-described phase difference will fall within a tolerance range. Therefore, a satisfactory reproduced video signal without horizontal synchronization disturbance can be obtained.

3 Claims, 6 Drawing Sheets

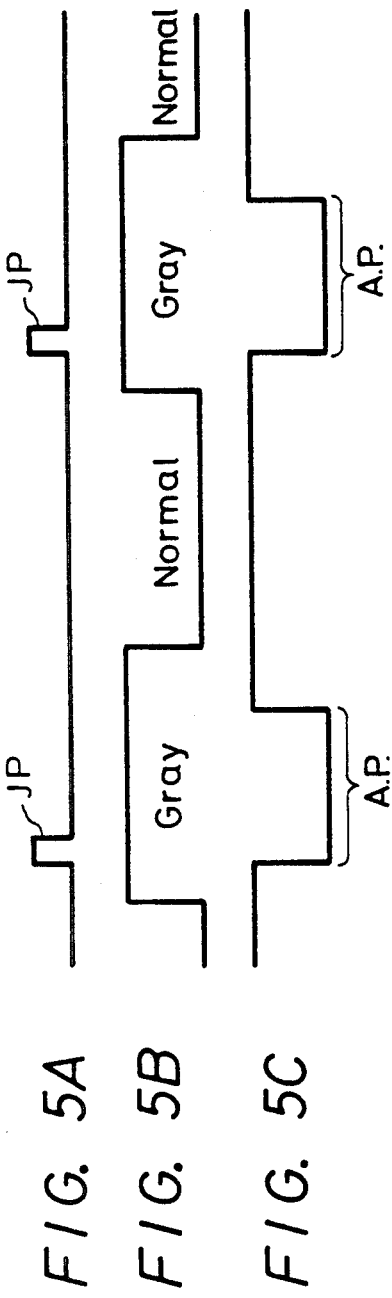
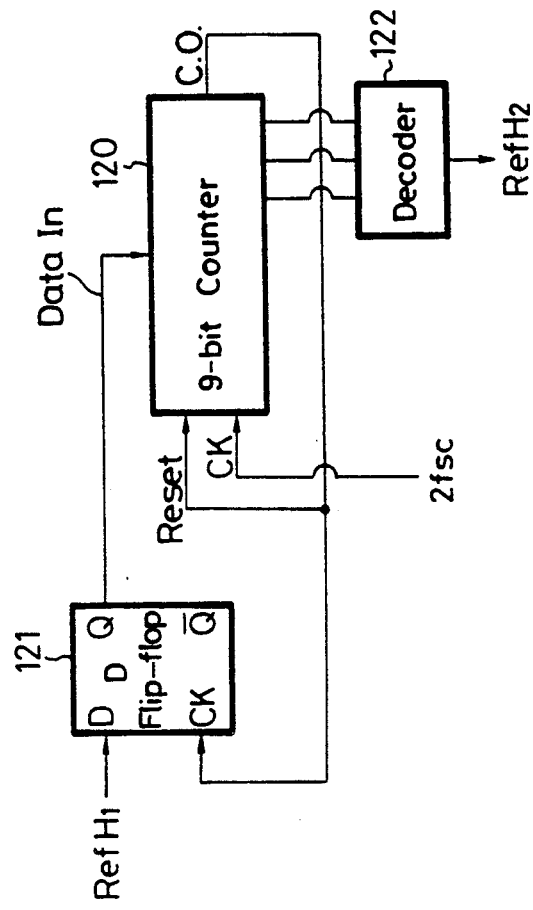
FIG. 5A
FIG. 5B
FIG. 5C
FIG. 7

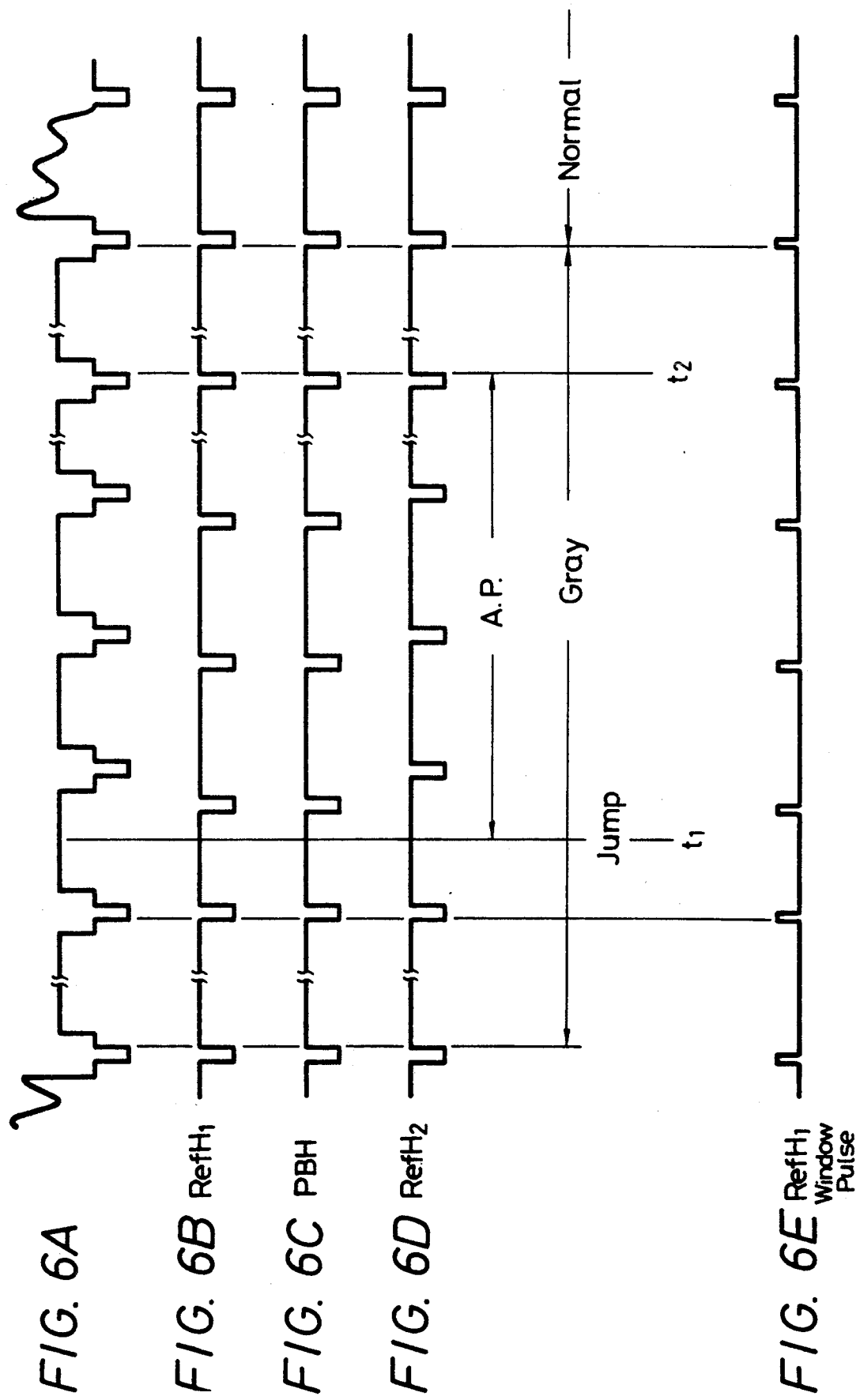

VIDEO DISC PLAYER

BACKGROUND OF THE INVENTION

1. Field of the Invention

The present invention relates to a video disc player for reproducing a video disc such as, an optical video disc, a compact disc video (CDV) and the like in which a video signal is recorded according to a so-called constant linear (CLV) format.

2. Description of the Prior Art

A so-called scan reproduction is known in the field of optical video disc players. During the scan reproduction, the picture is reproduced intermittently because a pickup head is scanned in the radial direction of the video disc at much higher speed than that of the normal mode with no picture reproduction and the pickup head is scanned at a normal speed intermittently for an intermittent picture reproduction. The scan reproduction is functionally similar to the picture search of video tape recorders (VTRs) when seen on the picture screen.

Incidentally, when the video disc recorded according to the CLV format is reproduced, the scan reproduction cannot be carried out without the provision of some special arrangement such as a video memory and the like in the prior art.

In order to remove the above-described disadvantage, the following method is proposed. That is, the number of tracks to be jumped in one track jump in the scanning operation is increased as much as possible thereby to reduce the number of track jumps, and also, a vertical synchronizing (sync.) signal involved in a reproduced video signal is suppressed, but instead a reference vertical synchronizing signal is inserted into the video signal regardless of the phase of the video signal. According to this proposal, a synchronization, for example, on a monitor receiver is stabilized by the referenced vertical synchronizing signal inserted into the video signal, whereby a reproduced picture, which is comparatively easy to see, can be obtained.

However, in the above-described proposal, since the reference vertical synchronizing signal is inserted into the video signal regardless of the phase of the video signal, it is frequently observed that the upper and lower half portions of the reproduced picture are displayed upside down. Further, when the vertical synchronizing signal is suppressed and the signal level of, for example, the vertical blanking period is fixed to a pedestal level, a black belt picture of a wide width is reproduced, and this black belt picture is vehemently moved up and down, resulting in a reproduced picture becoming considerably unnatural to see.

In order to remove the above-described defects, the same assignee of the present application has previously proposed a video disc reproducing apparatus (see Japanese Patent Laid-Open Gazette No. 01-265792). According to this proposal, an improvement of a track jump system is made, in which, after a main track jump, a second track jump is performed so that a phase difference between a phase of a vertical synchronizing signal involved in a reproduced video signal and a phase of a reference vertical synchronizing signal falls within a certain tolerance range thereby to fine adjust the position of the vertical synchronizing signal involved in the reproduced picture so as to be placed in the upper or lower side of the reproduced picture. Further, when the change of phase difference is too small to obtain the change of phase difference due to the second track jump, the reproduced vertical synchronizing signal is inserted into the reproduced video signal, whereby a satisfactory picture can be reproduced regardless of the momentary occurrence of the synchronization disturbance.

The above-described previously-proposed apparatus will be described hereinafter.

FIG. 1 is a block circuit diagram showing an overall arrangement of the previously-proposed apparatus.

Referring to FIG. 1, there is shown a video disc 1 in which a video signal is recorded according to the CLV format. The video disc 1 is rotated by a spindle motor 2 such that the video disc 1 is rotated at a constant linear velocity in response to a position of a pickup head 3 which will be described more fully later.

A video signal is picked up from the video disc 1 by the pickup head 3, and the signal picked-up is supplied to a reproducing circuit 4, from which there is derived a reproduced video signal. This reproduced video signal is supplied through switches 5, 6 and 7, which will be described later, to an output terminal 8.

A track detecting portion (not shown) of the pickup head 3 derives a signal, and this signal is supplied to a deviation detector circuit 9 which detects a deviation (shift) amount of the tracking. The deviation signal from the deviation detector circuit 9 is supplied through a switch 10 to a tracking coil 11, thereby controlling the tracking of the pickup head 3. Further, the signal from the switch 10 is supplied through a low-pass filter 12 and a switch 13 to a sled motor 14 so that the pickup head 3 is scanned in the radius direction of the video disc 1. In this way, the normal reproduction is carried out.

In the scan reproduction, a microcomputer 15 derives a driving signal by which the pickup head 3 is moved at high speed (i.e., approximately 30 times the normal speed). This control signal is supplied through the switch 13 to the sled motor 14.

The deviation signal from the deviation detector circuit 9 is supplied through the switch 10 to the tracking coil 11, thereby controlling the tracking of the pickup head 3. Simultaneously, the signal from the switch 10 is supplied through a low-pass filter 16 to a detector circuit 17 which detects a shift corresponding to 15 tracks (150T). A detected signal from the detector circuit 17 is supplied to the microcomputer 15, and the microcomputer 15 responds to the detected signal supplied thereto to generate a command signal of 150-track jump (TJ). This command signal is supplied to a 150-track jump control circuit 18. The switch 10 is turned OFF by a control signal from the control circuit 18, and a signal for effecting the track jump of 150 tracks is supplied from the control circuit 18 to the tracking coil 11. In actual practice, the track jump is performed by returning the tracking coil 11 to a center point.

Further, in this apparatus, during the track jump of 150 tracks, the detected signal (whose waveform is shown in FIG. 2A) is generated from the deviation detector circuit 9 and this detected signal is supplied to a masking signal generator circuit 19 having a waveform-shaping circuit (not shown) and a retriggerable monostable-multivibrator circuit (not shown), in which it is waveform-shaped as shown in FIG. 2B to be a masking signal whose waveform is shown in FIG. 2C. The masking signal from the masking signal generator circuit 19 is supplied to the microcomputer 15.

The reproduced video signal from the reproducing circuit 4 is supplied to a synchronizing (sync.) separator circuit 20, from which there is derived a vertical sync. signal PBV in the reproduced signal. The vertical sync. signal PBV from the separator circuit 20 is supplied to the microcomputer 15, and a reference vertical sync. signal Ref.V applied to a reference signal input terminal 21 is supplied to the microcomputer 15. The reference vertical sync. signal applied to the reference signal input terminal 21 is supplied to an 8-bit counter 22 which counts a clock signal having a half horizontal frequency (not shown). The count value of the counter 22 is reset by the vertical sync. signal so that the count value takes 0 to 131 cyclically. The count value of the counter 22 represents a phase difference relative to the reference vertical sync. signal Ref.V and, the count value is supplied to the microcomputer 15.

Therefore, the microcomputer 15 carries out the following processing.

FIGS. 3A and 3B are a main routine and a sub routine of a flow chart to which reference will be made in explaining an operation of the microcomputer 15. If, for example, a scan reproduction is commanded by operating a key (not shown), the high speed moving signal is generated and the 150-track jump command signal is generated in response to the detection of the shift of 150-track deviation, and the main routine shown in FIG. 3A is started.

Referring to the main routine shown in FIG. 3A, following the Start of operation, the processing of the microcomputer 15 proceeds to decision step ST-1, whereat it is initially determined whether or not the pickup head 3 reaches the innermost periphery (i.e., inner limit) of the video disc 1. If an answer is NO at step ST-1, then the processing of the microcomputer 15 proceeds to the next decision step ST-2, whereat it is determined whether or not the pickup head 3 reaches the outermost periphery (i.e., outer limit) of the video disc 1. If it is determined that the pickup head 3 does not reach the outer limit of the video disc 1 as represented by a NO at step ST-2, the processing of the microcomputer 15 proceeds to the next decision step ST-3. If a YES is outputted at one of the steps ST-1 and ST-2, the processing of the microcomputer 15 is stopped.

In decision step ST-3, it is determined whether or not another key is pressed. If a YES is outputted at step ST-3, the processing of the microcomputer 15 proceeds to another operation mode. If on the other hand it is determined that another key is not pressed as represented by a NO at step ST-3, the processing of the microcomputer 15 proceeds to the next step ST-4, wherein the sub routine for scan reproduction is called as will be described later with reference to FIG. 3B. After the sub routine shown in FIG. 3B is ended, the processing of the microcomputer 15 returns to step ST-1 of the main routine.

In the sub routine shown in FIG. 3B, following the Start of operation, the processing of the microcomputer 15 proceeds to step ST-11, whereat the microcomputer 15 awaits the arrival of the reference vertical sync. signal Ref.V. When the reference vertical sync. signal Ref.V is supplied to the microcomputer 15, then the processing of the microcomputer 15 proceeds to the next decision step ST-12. It is determined at decision step ST-12 whether or not the aforenoted masking signal is at high (H) level. If the masking signal is not at high level as represented by a NO at step ST-12, the processing of the microcomputer 15 proceeds to step ST-13, whereat the microcomputer 15 is placed in the standby mode during a one-half vertical period (i.e., ½ V≈8 milliseconds). Then, the processing of the microcomputer 15 proceeds to the next decision step ST-14, whereat it is determined one more time whether or not the masking signal is at high (H) level. If the masking signal is not at high level as represented by a NO at step ST-14, the sub routine is ended and the processing of the microcomputer 15 returns to the main routine because it can be decided at step ST-14 that the reproduced picture is already obtained after the track jump of 150 tracks is finished.

If on the other hand the masking signal is at high level as represented by a YES at either step ST-12 or step ST-14, the processing of the microcomputer 15 proceeds to step ST-15. In step ST-15 the microcomputer 15 is placed in the standby mode until the masking signal goes to low (L) level. When the masking signal goes to low (L) level at step ST-15, then the processing of the microcomputer 15 proceeds to step ST-16, wherein the microcomputer 15 awaits the arrival of the vertical sync. signal PBV involved in the reproduced video signal. When the microcomputer 15 is supplied with the vertical sync. signal PBV at step ST-16, then the processing of the microcomputer 15 proceeds to step ST-17, wherein the count value of the counter 22 is stored in CT2 located in an inner memory region of the microcomputer 15.

Accordingly, in the CT2, there is stored a phase difference between the vertical sync. signal reproduced just after the 150-track jump and the reference vertical sync. signal. In that case, if a tolerance range of phase difference is selected in a range of from ±12.5%, then it can be determined that CT2<17 or CT2>114 falls within tolerance range in the upper and lower portions of the reproduced picture. Then, the above-described range is identified at decision step ST-18. If a YES is outputted at step ST-18, the processing of the microcomputer 15 returns to the main routine.

If it is determined that the value of CT2 falls in a range of 17≦CT2≦114 as represented by a NO at step ST-18, then the processing of the microcomputer 15 proceeds to step ST-19. In step ST-19, a one track jump (1TJ) command signal is issued from the microcomputer 15. In the above-described apparatus, this command signal is supplied to a one track jump control circuit 23, whereby the switch 10 is turned OFF by the control signal from this control circuit 23 and a signal for effecting one track jump is fed to the tracking coil 11 from the control circuit 23.

At the completion of the one track jump at step ST-19, then the processing of the microcomputer 15 proceeds to step ST-20, whereat the microcomputer 15 awaits the supply of the vertical sync. signal PBV involved in the reproduced video signal. When the reproduced vertical synchronizing signal is supplied to the microcomputer 15 at step ST-20, then the processing of the microcomputer 15 proceeds to the next step ST-21, whereat the count value of the counter 22 is stored in a CT3 in the inner memory region of the microcomputer 15. Accordingly, in the CT3, there is stored a phase difference between the vertical synchronizing signal reproduced immediately after one track jump and the reference vertical synchronizing signal. The processing of the microcomputer 15 proceeds to the next decision step ST-22, whereat it is determined whether or not an inequality of CT3<17 or CT3>114 is established. If an answer is YES at step ST-22, it is determined that the phase difference falls within a tolerance range, and then the processing of the microcomputer 15 returns to the main routine.

If a NO is outputted at step ST-22, the processing of the microcomputer 15 proceeds to step ST-23, whereat an amount in which a difference between the values stored in CT2 and CT3, i.e., the change of the phase differences is computed and the computed result is stored in the CT1 in the inner memory region of the microcomputer 15.

The amount in which the phase difference is changed is computed as follows.

That is, by utilizing values (CT2 − $\theta_2$, CT3 − $\theta_3$) which result from normalizing the range (0 to 131) of values stored in CT2 and CT3 to 0 to 1, a decimal portion of the following term is made as $\theta$, $$\theta_3 + 1 - \theta_2$$

More specifically, in the above-described example, a remainder which divides CT3+131−CT2 by 131 is stored in CT1 of the inner memory region of the microcomputer 15. Accordingly, in step ST-23, the amount in which the phase difference per one track jump is changed is computed, and in that case, it can be decided that this amount is invariable in the range of approximately several 10s of tracks.

Then, in the next decision step ST-24, it is determined whether or not the value of CT1 is less than a pre-determined value. If the value of CT1 is less than the pre-determined value as represented by a YES at step ST-24, it is decided that the pickup head 3 is located in the dead zone (DZ) area in which the pickup head 3 cannot be fine adjusted within the tolerance range by the correction of several 10s of tracks.

If on the other hand the value of CT1 is not less than the predetermined value, or if the pickup head 3 is not located within the dead zone (DZ) area as represented by a NO at step ST-24, the processing of the microcomputer 15 proceeds to the next step ST-25, wherein the microcomputer 15 is placed in the standby mode until one millisecond elapses from the previous one track jump. After one millisecond elapses at step ST-25, the one track jump command is issued at step ST-26. Further, in step ST-27, CT3+CT1 is computed and a remainder provided by the division by 131 is stored in the inner memory region CT3. It is determined in the next decision step ST-28 whether or not CT3<17 or CT3>114 is established. If a NO is outputted at step ST-28, the processing of the microcomputer 15 returns to step ST-25, whereat the above-described steps are repeated. If on the other hand a YES is outputted at step ST-28, it is decided that the additional or fine track jump is completed, and the processing of the microcomputer 15 returns to the main routine.

According to the aforenoted operations, without detecting the reproduced vertical synchronizing signal at every track jump, the fine track jump operation of the phase difference can be carried out only by computing the values of CT1 and CT3 in quite a short period of time.

Accordingly, in the above-described apparatus, by switching the switch 5 so that a voltage (potential) corresponding, for example, to the gray level signal from the voltage source 24 is inserted into the reproduced video signal during a period of time where the sub routine shown in FIG. 3B is ended from the leading edge of the masking signal and the processing of the microcomputer 15 returns to the main routine shown in FIG. 3A, the scan reproduction can be satisfactorily carried out without producing a disturbed reproduced picture.

Further, at the completion of the sub routine shown in FIG. 3B, similarly as described in the prior art, the reproduced vertical synchronizing signal is supplied to a suppressor circuit 25, and during this period, the switch 6 is changed-over to permit a black level voltage signal from a voltage source 26 to be supplied to the switch 7 therethrough. Also, the reference vertical synchronizing signal is supplied to an insertion circuit 27, and during this period, the switch 7 is changed-over so that, during this period, the voltage signal of the synchronizing level is inserted into the reproduced video signal.

Accordingly, in the above-described apparatus, a reproduced image of stable picture can be obtained. Further, according to the above-described apparatus, since the second track jump in which one track jump is repeated is carried out after the first 150-track jump, the phase of the vertical synchronizing signal in the reproduced video signal falls within a desired tolerance range relative to the reference vertical synchronizing signal, whereby the position of the vertical synchronizing signal in the reproduced video signal can be fine adjusted so as to locate at the upper or lower side of the reproduced picture.

Further, in the above-mentioned flow chart, if the value of CT1 is less than the predetermined value as represented by a YES at step ST-24, or if the value of CT1 lies in the dead zone area, the processing of the microcomputer 15 proceeds to step ST-29, whereat the dead zone processing is carried out, and the processing of the microcomputer 15 returns to the main routine shown in FIG. 3A.

In the dead zone processing, the reproduced vertical synchronizing signal is supplied to, for example, the vertical synchronizing signal inserting circuit 27, whereby the switch 7 is changed-over in position by the reproduced vertical synchronizing signal during the dead zone processing period. Alternatively, the suppressor circuit 25 and the insertion circuit 27 are both made inoperative during the dead zone processing period. Consequently, when the phase is not changed by the second track jump, the reproduced vertical synchronizing signal is inserted into the reproduced video signal so that, although a synchronization disturbance occurs momentarily, a satisfactory video image can be obtained thereafter.

Nevertheless, in the above-described apparatus, if a time base correction (TBC) circuit is provided within the reproducing circuit 4, the reference horizontal synchronizing signal must be matched with the reproduced synchronizing signal in order to quickly settle the TBC. Thus, when a picture is changed in the order of a scan reproduced picture, a gray level picture and a reproduced picture, the phases of all reference horizontal synchronizing signals are not always matched with that of the reproduced synchronizing signal so that the horizontal synchronization disturbance occurs each time the picture is changed, resulting in the picture being made difficult to see.

OBJECTS AND SUMMARY OF THE INVENTION

Accordingly, it is an object of the present invention to provide an improved video disc player which can eliminate the aforenoted shortcomings and disadvantages encountered with the prior art.

More specifically, it is an object of the present invention to provide a video disc player in which, upon scan reproduction, a picture can be reproduced with less horizontal synchronization disturbance.

According to an aspect of the present invention, a video disc player for reproducing a video signal recorded on a video disc with the constant linear velocity is comprised of a pickup head scanned in the radial direction of the video disc for obtaining a reproduced video signal therefrom, a time base corrector connected to the pickup head for correcting the time base error of the reproduced signal, a signal output circuit connected to the time base corrector, a first horizontal oscillator to be used for controlling the time base corrector, a gray level source for applying a gray level signal to the signal output circuit, a second horizontal oscillator separately provided with the first horizontal oscillator for adding a reference horizontal synchronizing signal to the gray level signal, a sync. separator connected to the input side of the time base corrector for separating a horizontal signal from the reproduced video signal, and a scan reproducing circuit for scanning the pickup head in the radial direction of the video disc at a higher speed intermittently by means of a series of track jumps, the scan reproducing circuit selectively and intermittently applying the gray level signal and the reproduced signal to the signal output circuit in synchronism with the series of track jumps. This video disc player is characterized by a synchronizing circuit for synchronizing the first horizontal oscillator with the horizontal signal from the sync. separator during the track jump periods, a phase detector for detecting the phase difference between the output signals of the first and second horizontal oscillators during the track jump periods, and a control circuit connected between the phase detector and the second horizontal oscillator for controlling the frequency of the latter until the phase difference becomes substantially zero.

The preceding and other objects, features and advantages of the present invention will become apparent from the following detailed description of a preferred embodiment when read in conjunction with the accompanying drawings, in which like reference numerals are used to identify the same or similar parts in the several views.

BRIEF DESCRIPTION OF THE DRAWINGS

FIGS. 5A to 5C and FIGS. 6A to 6E are respectively timing charts used in understanding an operation of the video disc player according to the present invention; and FIG. 7 is a schematic diagram showing examples of practical circuit arrangements of a horizontal signal oscillator and a coincidence detector circuit used in the present invention.

DETAILED DESCRIPTION OF A PREFERRED EMBODIMENT

Figure 1:
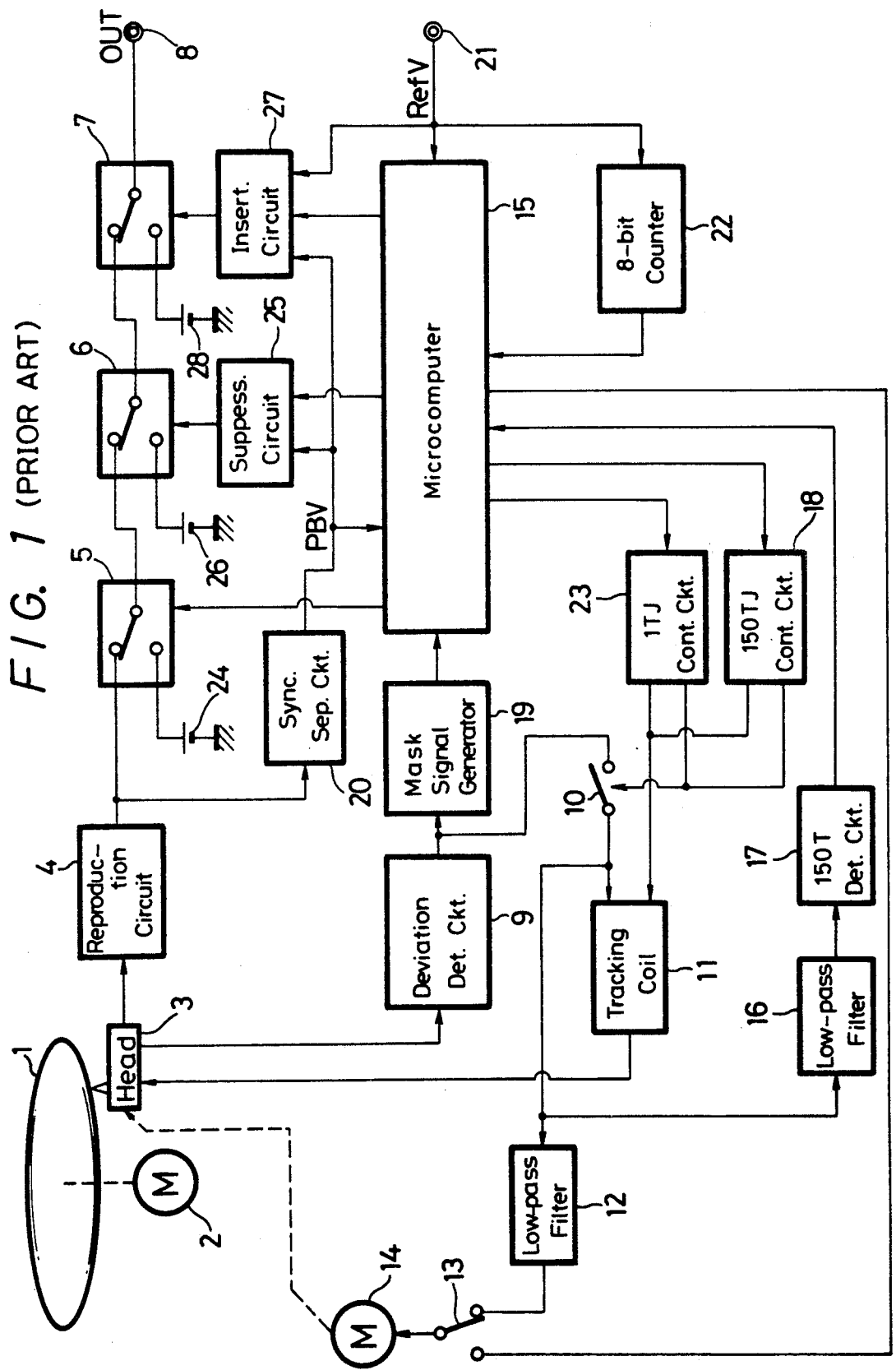
FIG. 1 is a block circuit diagram showing an example of a previously-proposed video disc reproducing apparatus.
Figure 2A:
FIGS. 2A to 2C are waveform diagrams of a detection signal from a masking signal generator circuit, and to which reference will be made in explaining an operation of the previously-proposed apparatus.
Figure 2B:
Figure 2C:
Figure 3A:
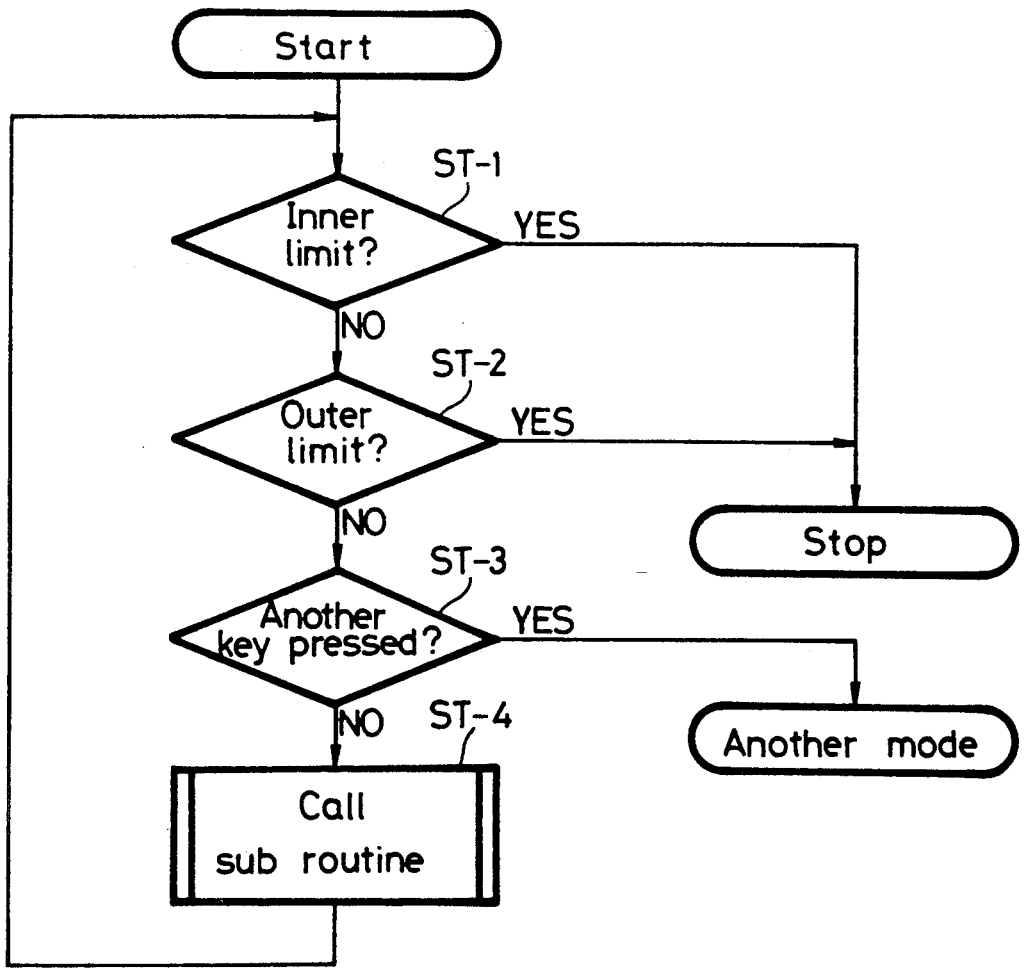
FIGS. 3A and 3B are a main routine and a sub routine forming a flow chart to which reference will be made in explaining the operation of the previously-proposed apparatus.
Figure 3B:
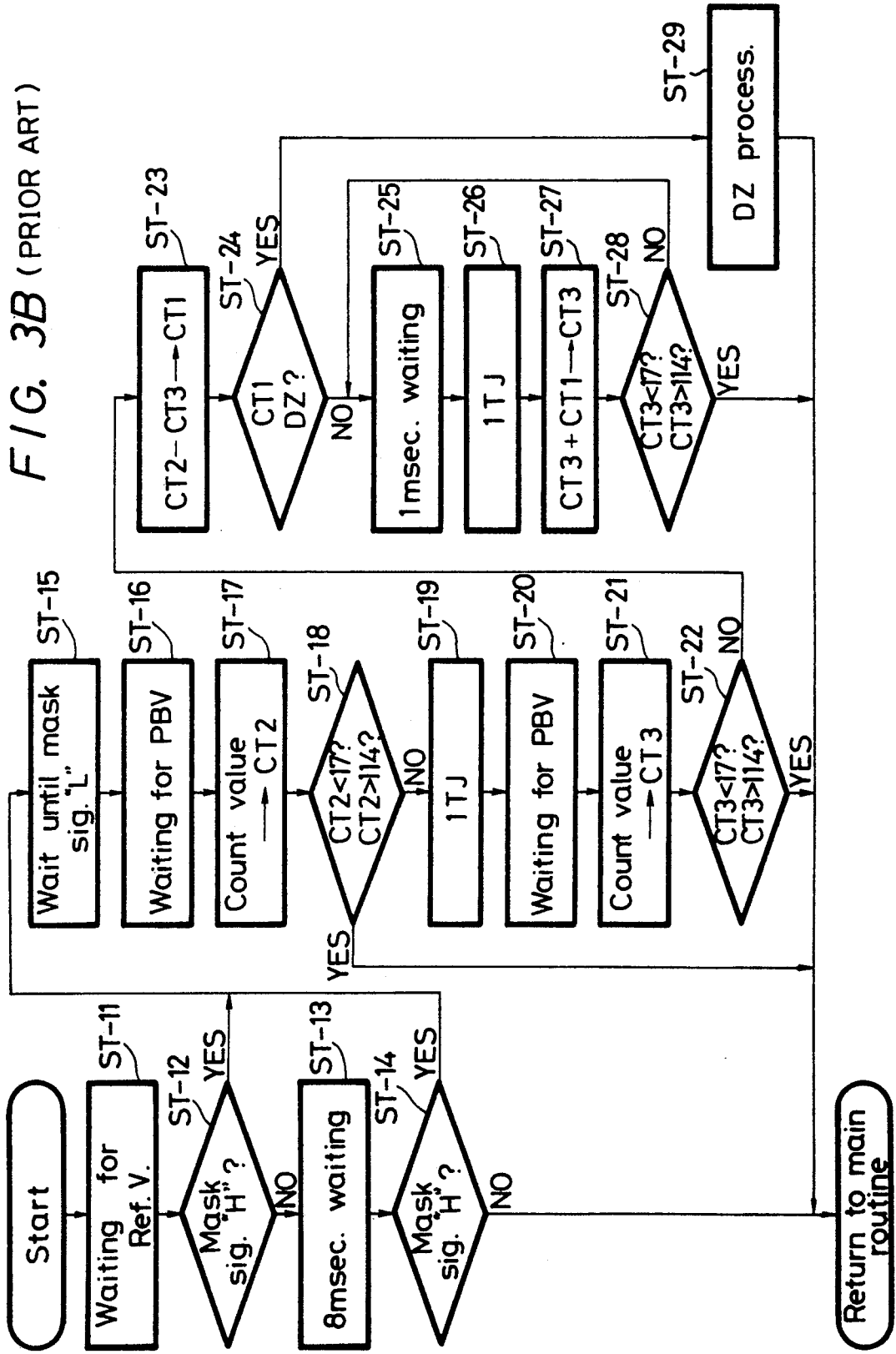
Figure 4:
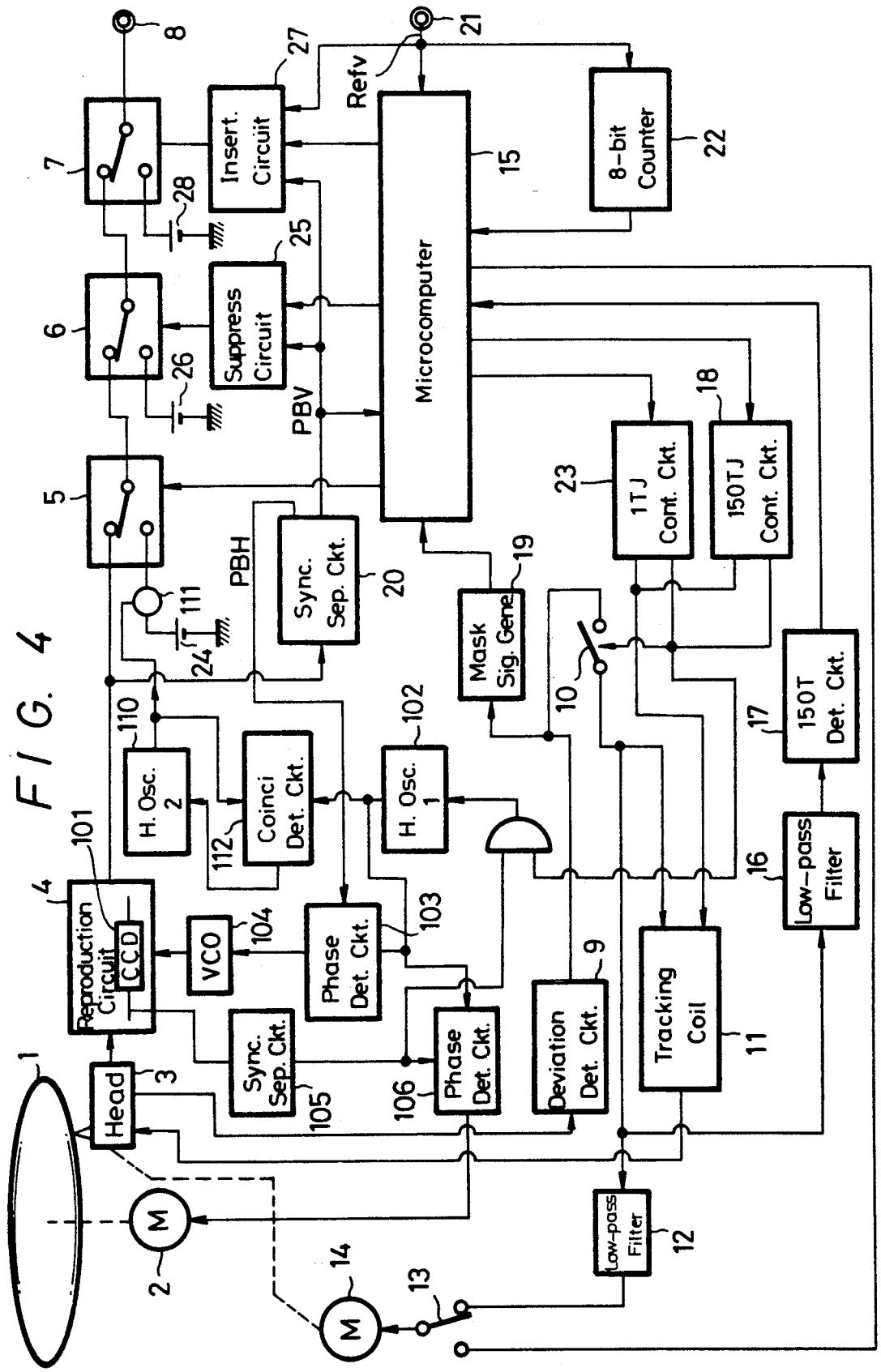
FIG. 4 is a block circuit diagram showing an embodiment of a video disc player according to the present invention.

Referring to the drawings in detail, and initially to FIG. 4 in which like parts corresponding to those of FIG. 1 are marked with the same references and therefore need not be described in detail, a charge coupled device (CCD) 101 is provided within the reproduction circuit 4 as a time base corrector (TBC). A first horizontal sync. signal generator circuit 102 generates a first horizontal sync. signal, and the sync. separator circuit 20 derives a reproduced horizontal sync. signal PBH. The first horizontal sync. signal and the reproduced horizontal sync. signal PBH are supplied to a phase detector circuit 103, in which they are phase-compared with each other and then detected. The detected result from the phase detector circuit 103 is supplied to a voltage controlled oscillator (VCO) 104. The voltage controlled oscillator 104 derives a clock signal having a variable frequency, and this clock signal is supplied to the CCD 101, thereby the time base correction being performed.

Upon track jump, the horizontal synchronizing signal from the first horizontal sync. signal generator circuit 102 is controlled such that the phase thereof may follow that of the horizontal synchronizing signal inputted to the reproducing circuit 4. More precisely, a sync. separator circuit 105 is connected to the input side of the reproduction circuit 4 (i.e., CCD 101) whereby the first horizontal sync. signal generator circuit 102 is reset by a horizontal sync. signal from the sync. separator circuit 105 during the period of the track jump control signal from the track jump control circuit 18, resulting in the follow-up property of the horizontal sync. signal of the first horizontal sync. signal generator circuit 102 being increased. Thus, the TBC can be settled in a reduced period of time.

The phase difference between the horizontal sync. signal from the first horizontal sync. signal generator circuit 102 and the horizontal sync. signal from the sync. separator circuit 105 are detected by the phase detector circuit 106 and the phase difference signal from the phase detector circuit 106 is supplied to the spindle motor 2, whereby the spindle motor 2 is servo-controlled.

Further, upon track jump, the video signal is the gray level signal, and in that case, the horizontal sync. signal is superimposed upon the reproduced output signal developed at the output terminal 8. The horizontal sync. signal is superimposed upon the reproduced output signal at the preceding stage of the switch 5, i.e., at the voltage source 24 which generates the voltage signal corresponding to the gray level signal. To implement this superimposing operation, a second reference horizontal sync. signal generator circuit 110 is provided to generate a second reference horizontal sync. signal. This second horizontal reference sync. signal is fed to an adder 111 which is connected to the voltage source 24.

The phases of the horizontal sync. signals from the circuits 103, 20 and 110 are represented in FIGS. 6B, 6C and 6D, respectively. More specifically, as shown in FIGS. 6B, 6C and 6D, under the control of the circuits 103, 104 and 101, the phase of the horizontal sync. signal RefH1 from the first horizontal sync. signal generator circuit 102 and the phase of the horizontal sync. signal PBH from the sync. separator circuit 20 are made coincident with each other, and the phase of the horizontal sync. signal RefH2 from the second horizontal sync. signal generator circuit 110 is not coincident with the phases of the two horizontal sync. signals RefH1 and PBH during a gray level picture period.

FIG. 5A shows a track jump pulse JP, FIG. 5B shows the kinds of pictures provided before and after the track jump pulse JP, and FIG. 5C shows a control signal for a coincidence detector circuit 112 which will be described later. From the foregoing, it will be clear that the most specific feature of this invention lies in that the frequency of the horizontal sync. signal from the second reference horizontal sync. signal generator circuit 110 is controlled during a gray level picture period.

As shown in FIG. 4, the coincidence detector circuit 112 is provided to detect whether or not the phase of the first reference horizontal sync. signal RefH1 from the circuit 102 and the phase of the second reference horizontal sync. signal RefH2 from the circuit 110 are coincident with each other. If they are not coincident with each other, the horizontal period of the second reference horizontal sync. signal RefH2 is reduced by, for example, 300 nano-seconds. Although the same effect will be achieved if the horizontal period of the second reference sync. signal RefH2 is increased by 300 nano-seconds, the example in which the horizontal period of the second reference horizontal sync. signal is reduced by 300 nano-seconds is represented in FIG. 6D.

As shown by the adjusting period AP in FIG. 5C, the phase of the second reference horizontal sync. signal RefH2 is controlled to coincide with the phase of the first reference horizontal sync. signal RefH1 slowly by slightly changing the period of the second reference horizontal sync. signal RefH2 in a response range of an automatic frequency control (AFC) of a television receiver. As shown in FIGS. 6A to 6E, the adjusting period AP extends from a time point $t_1$ to a time point $t_2$, and during this adjusting period AP, the period of the second reference horizontal sync. signal RefH2 is reduced by, for example, 300 nano-seconds. Therefore, as will be clear from the comparison of FIGS. 6B and 6D, the second reference horizontal sync. signal RefH2 gradually catches up with the first reference horizontal sync. signal RefH1 and becomes completely coincident with the first reference horizontal sync. signal RefH1 at the time point $t_2$. In the succeeding processing, the output of the coincidence detector circuit 112 is changed and, the horizontal period of the second reference horizontal sync. signal is returned to the standard horizontal period, whereby the phases of the first and second reference horizontal sync. signals are made coincident with each other. Thus, when the gray level picture is changed to the normal picture, the horizontal synchronization can be prevented from being disturbed because the phases of the first and second reference horizontal sync. signals are coincident with each other.

The horizontal signal oscillator 110 and the coincidence detecting circuit 112 are constructed, in practice, by using a 9-bit counter 120, a D type flip-flop circuit 121 and a decoder 122 as shown in FIG. 7, by way of example.

As shown in FIG. 7, the normal horizontal frequency is expressed as 2 fsc × 1/455 so that, when data inputted to the 9-bit counter 120 is at high (H) level, the 9-bit counter 120 counts 455 steps ranging from 57 to 511 or that, when data inputted is at low (L) level, the 9-bit counter 120 counts 451 steps from 61 to 511. Thus, the horizontal frequency is changed from 1/455 to 1/451, thereby the time period being reduced. Referring to FIG. 7, if a window pulse of the first reference horizontal sync. signal RefH1 is supplied to an input terminal D of the D type flip-flop circuit 121 and a carry-out (C.O.) signal from the 9-bit counter 120 is supplied to a clock input terminal CK of the D type flip-flop circuit 121, it is possible to realize a coincidence detecting circuit which can detect whether or not the phases of the first and second reference horizontal sync. signals are coincident with each other. A combination of the 9-bit counter 120 and the D type flip-flop circuit 121 can provide the second reference horizontal sync. signal having a predetermined pulse width.

According to the present invention, as set out above, it is possible to obtain a scan reproduction picture having less horizontal synchronization disturbance.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

We claim as our invention:

1. A video disc player for reproducing a video signal recorded on a video disc with the constant linear velocity comprising:

a pickup head scanned in the radial direction of said video disc for obtaining a reproduced video signal therefrom;

time base correction means connected to said pickup head for correcting the time base error of said reproduced signal;

signal output means connected to said time base correction means;

a first horizontal oscillator to be used for controlling said time base correction means;

a gray level source for applying a gray level signal to said signal output means;

a second horizontal oscillator separately provided with said first horizontal oscillator for adding a reference horizontal synchronizing signal to said gray level signal;

a sync. separator connected to the input side of said time base correction means for separating a horizontal signal from said reproduced video signal; and scan reproducing means for scanning said pickup head in the radial direction of the video disc at a higher speed intermittently by means of a series of track jumps, said scan reproducing means selectively and intermittently applying said gray level signal and said reproduced signal to said signal output means in synchronism with said series of track jumps, characterized by synchronizing means for synchronizing said first horizontal oscillator with the horizontal signal from said sync. separator during said track jumps;

phase detection means for detecting the phase difference between the output signals of said first and second horizontal oscillators during said track jumps; and control means connected between said phase detection means and said second horizontal oscillator for controlling the frequency of the latter until said phase difference becomes substantially zero.

2. A video disc player according to claim 1, wherein said control means is formed as frequency changing means for slightly changing the frequency of said second horizontal oscillator when said phase difference is detected.

3. A video disc player according to claim 2, wherein the horizontal period of said second horizontal oscillator is changed by the order of hundreds of nanoseconds.

* * * * *